(12) United States Patent
Feinbloom et al.

(10) Patent No.: US 10,725,284 B1
(45) Date of Patent: *Jul. 28, 2020

(54) MAGNIFICATION DEVICE AND ASSEMBLY

(71) Applicant: Designs for Vision, Inc., Bohemia, NY (US)

(72) Inventors: Richard E. Feinbloom, New York, NY (US); Liviu Steier, Mayen (DE)

(73) Assignee: Designs for Vision, Inc., Bohemia, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/192,768

(22) Filed: Nov. 15, 2018

Related U.S. Application Data

(63) Continuation of application No. 15/632,290, filed on Jun. 23, 2017, now Pat. No. 10,215,977, which is a
(Continued)

(51) Int. Cl.
*G02B 5/22* (2006.01)
*G02B 27/02* (2006.01)
(Continued)

(52) U.S. Cl.
CPC ............ *G02B 25/004* (2013.01); *G02B 5/22* (2013.01); *G02B 5/26* (2013.01); *G02B 13/0015* (2013.01);
(Continued)

(58) Field of Classification Search
CPC . G02B 5/00; G02B 5/003; G02B 5/20; G02B 5/205; G02B 5/208; G02B 5/22;
(Continued)

(56) References Cited

U.S. PATENT DOCUMENTS 2,986,969 A    6/1961   Muncheryan
3,273,456 A    9/1966   Feinbloom
(Continued)

FOREIGN PATENT DOCUMENTS

WO    WO/2013/054797    *   4/2013

OTHER PUBLICATIONS

Prof. L. J. Walsh, F. Shakibaie, "Ultraviolet-Induced Fluorescence: Shedding New Light on Dental Biofilms and Dental Caries," Australasian Dental Practice, Nov./Dec. 2007, pp. 56-58.

*Primary Examiner* — Thong Q Nguyen
(74) *Attorney, Agent, or Firm* — Law Office of Carl Giordano, PC

(57) ABSTRACT

A magnification device including a housing having a distal open end and a proximal open end is disclosed. The housing includes an optical system including one or more objective lenses adjacent the distal open end, and one or more eye lenses adjacent the proximal open end, the optical system produced a desired level of magnification; and a filtering system having first filter selectively filtering a first group of wavelengths and a second filter selective filtering a second group of wavelengths. The first and second filters having an optical density selected based on a magnification level of the optical system. A vision enhancing assembly including a carrier device and one or more magnification devices coupled to the carrier device is also disclosed, wherein the magnification devices include filters that have optical densities based on a magnification level.

25 Claims, 8 Drawing Sheets

Related U.S. Application Data continuation-in-part of application No. 14/051,446, filed on Oct. 11, 2013, now Pat. No. 10,061,115, which is a continuation-in-part of application No. 13/065,809, filed on Mar. 30, 2011, now abandoned.

(51) Int. Cl.
| | | |
|---|---|---|
| *G02B 25/00* | (2006.01) | |
| *G02B 13/00* | (2006.01) | |
| *G02B 13/14* | (2006.01) | |
| *G02B 25/02* | (2006.01) | |
| *G02B 5/26* | (2006.01) | |

(52) U.S. Cl.
CPC ........... *G02B 13/14* (2013.01); *G02B 25/005* (2013.01); *G02B 25/007* (2013.01); *G02B 25/008* (2013.01); *G02B 25/02* (2013.01)

(58) Field of Classification Search
CPC . G02B 5/223; G02B 5/26; G02B 5/28; G02B 5/281; G02B 23/00; G02B 23/14; G02B 23/16; G02B 23/2407; G02B 23/2461; G02B 25/00; G02B 25/002; G02B 25/004; G02B 25/007; A61B 1/00; A61B 1/04; A61B 1/06; A61B 6/00; A61B 5/0071; A61B 5/0084; A61B 5/01; A61B 5/742

See application file for complete search history.

(56) References Cited

U.S. PATENT DOCUMENTS

| | | | |
|---|---|---|---|
| 3,519,339 A | 7/1970 | Hutchinson | |
| 4,089,117 A | 5/1978 | Villarreal | |
| 4,511,225 A | 4/1985 | Lipson | |
| 5,162,647 A | 11/1992 | Field, Jr. | |
| 5,558,836 A * | 9/1996 | Rounbehler | G01N 21/15 356/218 |
| 5,667,291 A | 9/1997 | Caplan | |
| 5,709,459 A * | 1/1998 | Gourgouliatos | F21L 14/00 362/105 |
| 7,009,074 B2 | 3/2006 | Halm | |
| 7,286,287 B1 | 10/2007 | Ofner | |
| 7,477,451 B2 | 1/2009 | Katz | |
| 7,532,394 B2 | 5/2009 | Gebelein | |
| 8,120,847 B2 | 2/2012 | Chang | |
| 9,713,502 B2 * | 7/2017 | Finkman | A61B 90/30 |
| 10,215,977 B1 * | 2/2019 | Feinbloom | G02B 25/004 |
| 2001/0005281 A1 * | 6/2001 | Yu | G02B 23/00 359/400 |
| 2002/0097230 A1 * | 7/2002 | Lowry | G06F 3/03542 345/175 |
| 2003/0002036 A1 * | 1/2003 | Haan | G02B 23/2492 356/241.1 |
| 2008/0082000 A1 * | 4/2008 | Thoms | A61B 1/00177 600/476 |
| 2008/0219654 A1 | 9/2008 | Border | |
| 2009/0073558 A1 * | 3/2009 | Jacobs | G02B 27/017 359/464 |
| 2010/0053540 A1 | 3/2010 | Blayden | |
| 2010/0210951 A1 | 8/2010 | Rahman | |
| 2010/0305436 A1 * | 12/2010 | Chen | A61B 90/35 600/431 |
| 2011/0270035 A1 | 11/2011 | Gono | |
| 2012/0120636 A1 | 5/2012 | Wilt | |
| 2014/0036356 A1 | 2/2014 | Feinbloom | |
| 2014/0210972 A1 * | 7/2014 | On | G02B 7/36 348/65 |

* cited by examiner

MAGNIFICATION DEVICE AND ASSEMBLY

CLAIM OF PRIORITY

This application claims, pursuant to 35 USC 120, priority to, and the benefit of the earlier filing date, as a Continuation, to that application filed on Jun. 23, 2017 and afforded Ser. No. 15/632,290 (now U.S. Pat. No. 10,215,977), which claimed, pursuant to 35 USC 120, as a Continuation-in-part, priority to, and the benefit of the earlier filing date of, that patent application entitled "Magnification Device and Assembly," filed on Oct. 11, 2013 and afforded Ser. No. 14/051,446 (now U.S. Pat. No. 10,061,115), which claimed, pursuant to 35 USC 120, priority to, and the benefit of the earlier filing date of, as a Continuation-in-part, that patent application entitled "Magnification Device and Assembly," filed on Mar. 30, 2011 and afforded Ser. No. 13/065,809 (abandoned), the entire contents of all of which are incorporated, herein, by reference.

BACKGROUND OF THE INVENTION

Field of the Invention

The invention relates generally to optical devices, and more particularly, to optical magnification devices for use in the presence of a source of electromagnetic radiation.

Background Information

Electromagnetic radiation is currently used in a variety of fields for visualization and identification of structures. Ultra-Violet (UV) light, as well as Infra-red (IR) light are most commonly used. In the field of dental procedures, fluorescence based methods are often used to provide an objective assessments of the carious process. Fluorescence is a form of photoluminescence and is defined as the absorption of UV light (1 to 400 nm—invisible light) by an object and its spontaneous emission in longer wavelengths (430 to 450 nm—visible light). Auto-fluorescence of teeth is based on the presence of endogenous fluorophores residing in the enamel and dentine.

Light Emitting Diodes (LEDs) and lasers (referred to herein as LED) have found utility in a number of applications, including, for example, communications, energy production, electronics, cosmetology, dermatology, medicine, and dentistry. An example of an LED UV illumination system is the Cobra Ultra Vision produced by Gnatus Medical Dental Equipments Ltd. Brazil, that uses UV light generated by LEDs.

However, the UV light (or electromagnetic radiation) emitted from an LED may be extremely intense and highly collimated. When a UV light is used, for example, during a medical or dental procedure, the surgeon or dentist must wear an eye protection device, for example, safety glasses, to avoid damage to their eyes as the UV wavelength emitted by the LED can cause significant damage to the eyes.

In addition to UV LEDs being used in dental procedures to distinguish health tissue from diseased tissue, magnification devices are used by dentists during dental procedures, for the purpose of magnifying the work area. The magnified work area allows the dentist to precisely place the instruments in treating cavities and other dental issues. The magnification devices used may include telescopes, microscopes, endoscopes, and eye-loupes.

However, exposure to light in the UV, (1 to 400 nm), visible (400 nm to 700 nm) and near-infrared (700 nm to 1400 nm) regions of the spectrum (retinal hazard region) may damage the retina, particularly when viewed through magnifying optical devices, as the energy of the light being viewed through the magnifying devices concentrate and increase the viewed light.

Currently available LED safety glasses or goggles filter out the wavelength or wavelengths emitted by the LED, with the goal of providing maximum visible light transmission (VLT). To filter out the wavelength, chemical additives or dyes or thin films may be added to a filter (in the form of a lens), which may be formed of polycarbonate, glass, or other suitable material, to match, and consequently absorb, the wavelength and power of the source of LED radiation. In addition to absorptive, reflective filters may also be used.

Depending upon the LED and the application, the attenuation or optical density (OD) of the filter lens at a specific wavelength should be specified. Since LEDs may radiate at more than one wavelength, eyewear designed to have an adequate OD (optical density) of a particular wavelength may have an inadequate OD at another wavelength for light emitted by the same LED. Most eye protection glasses or goggles use selective wavelength attenuation to protect eyes from harmful LED radiation while permitting the eyes to see something of interest, by filtering radiation inside and outside the visible range, yet many of the currently-available devices are cumbersome or uncomfortable when used in conjunction with an optical magnifying device.

Accordingly, there remains a need for optical magnification devices suitable for use in the presence of a radiation-emitting source to protect the eyes of a dentist or other professional using magnification lens.

SUMMARY OF THE INVENTION

Briefly described, according to an aspect of the invention, a magnification device includes a housing including a distal open end and a proximal open end, an optical system including one or more objective lenses mounted in the housing adjacent the distal open end, and one or more eye lenses mounted in the housing adjacent the proximal open end, achieving a desired level of magnification, and a filtering system comprising a first filter lens mounted to adjacent the distal open end of the housing and a second filter lens mounted adjacent to the proximal open end the one or more eye lenses, the first and second filter lens having first and second optical densities, respectively, selected based on the desired level of magnification.

According to another aspect of the invention, a vision enhancing assembly includes a carrier device, one or more magnification devices coupled to the carrier device, each of the magnification devices including a housing including a distal open end and a proximal open end, an optical system including one or more objective lenses mounted in the housing adjacent the distal open end, and one or more eye lenses mounted in the housing adjacent the proximal open end, the optical system achieving a desired level of magnification, and a filtering system having first and second filtering lens, each having an optical density based on the desired level of magnification.

BRIEF DESCRIPTION OF THE DRAWINGS

The advantages, nature, and various additional features of the invention will appear more fully upon consideration of the illustrative embodiments now to of the described in detail in connection with accompanying drawings where like reference numeral to identify like element throughout the drawings:

FIG. 8 is a front elevational view of an assembly illustrating magnification devices in a carrier device;

FIG. 9 is a rear elevational view of the assembly illustrated in FIG. 8;

It is noted that the drawings of the invention are not to scale. The drawings are intended to depict only typical aspects of the invention, and therefore should not be considered as limiting the scope of the invention. In the drawings, like numbering represents like elements between the drawings.

It is to be understood that the figures and descriptions of the present invention described herein have been simplified to illustrate the elements that are relevant for a clear understanding of the present invention, while eliminating, for purposes of clarity, many other elements. However, because these omitted elements are well-known in the art, and because they do not facilitate a better understanding of the present invention, a discussion of such elements are not provided herein. The disclosure, herein, is directed also to variations and modifications known to those skilled in the art.

DETAILED DESCRIPTION OF THE INVENTION

As used herein, the terms "comprises", "comprising", "includes", "including", "has", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "of" refers to an inclusive "or" and not to an exclusive "or". For example, a condition A or B is satisfied by any one of the following: A is true (or present) and B is false (or not present); A is false (or not present) and B is true (or present); and both A and B are true (or present).

The terms "a" or "an" as used herein are to describe elements and components of the invention. This is done for convenience to the reader and to provide a general sense of the invention. The use of these terms in the description herein should be read and understood to include one or at least one. In addition, the singular also includes the plural unless indicated to the contrary. For example, reference to a composition containing "a compound" includes one or more compounds. As used in this specification and the appended claims, the term "or" is generally employed in its sense including "and/or" unless the content clearly dictates otherwise.

All numeric values are herein assumed to be modified by the term "about," whether or not explicitly indicated. The term "about" generally refers to a range of numbers that one of skill in the art would consider equivalent to the recited value (i.e., having the same function or result). In any instances, the terms "about" may include numbers that are rounded (or lowered) to the nearest significant figure.

Figure 1:
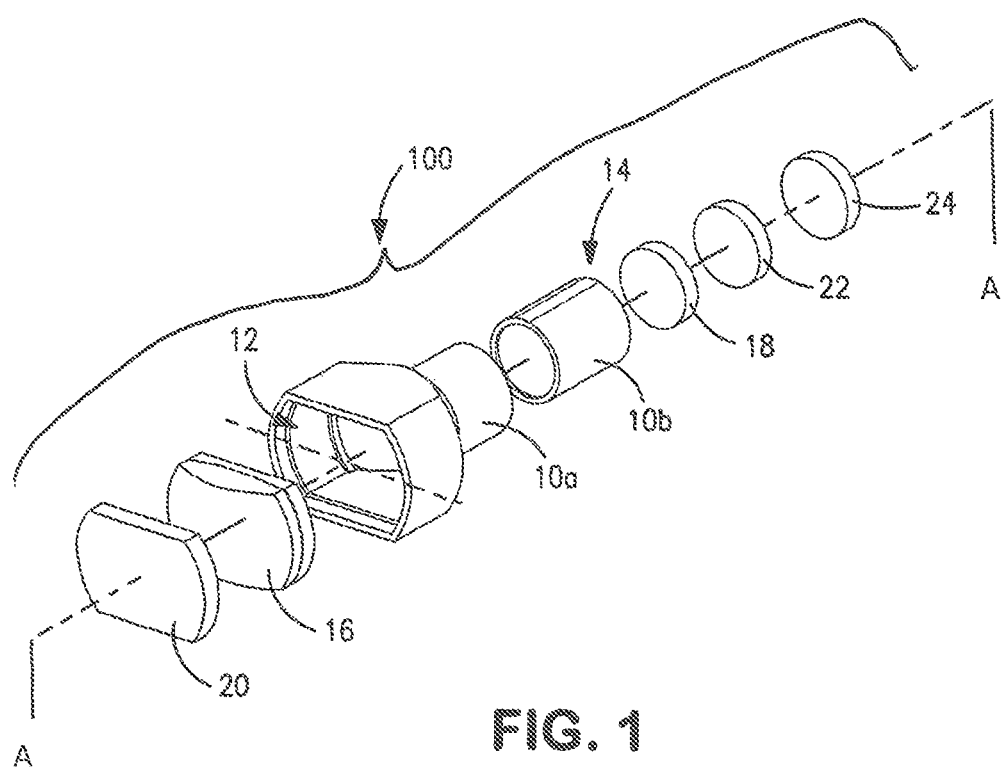
FIG. 1 is an exploded perspective view of a magnification device according to a first aspect of the invention.

Referring to FIG. 1, a magnification device 100 according to a first aspect of the invention is illustrated. Separate housing portions 10a and 10b are provided to allow for the precise placement of the objective lens(es) 16 and the eye lens(es) 18 prior to assembly. The housing portions 10a and 10b are formed of a relatively rigid and lightweight plastic material. Housing portion 10a includes a Galilean optical system with one or more objective lenses 16 mounted in housing 10a adjacent the distal open end 12. The objective lens(es) 16 may include, but are not limited to, convex, biconvex, plano convex, doublet plano-convex, doublet biconvex, double convex crown and concave flint, and other suitable precision magnification lenses.

According to an aspect of the invention, there may be one, two, or three objective lenses 16 present. The device 100 illustrated in FIG. 1 includes two lenses that are coupled together to form the objective lens 16. The resulting achromat lens 16 minimizes chromatic aberration. According to an aspect of the invention, the objective lens(es) 16 may be substantially rectangular. When a rectangular objective lens 16 is employed, a wider field of view is obtained, as more light is allowed to enter the device. According to another aspect of the invention, the objective lens(es) 16 may be substantially circular.

Still referring to FIG. 1, the Galilean optical system further includes one or more eye lens(es) 18 mounted in housing portion 10b adjacent the proximal end 14 thereof. The eye lens(es) 18 may include, but are not limited to, concave, biconcave, plano-concave, negative, diverging, and other suitable precision magnification lenses. According to an aspect of the invention, the eye lens(es) 18 may be bi-concave, or negative.

Figure 2:
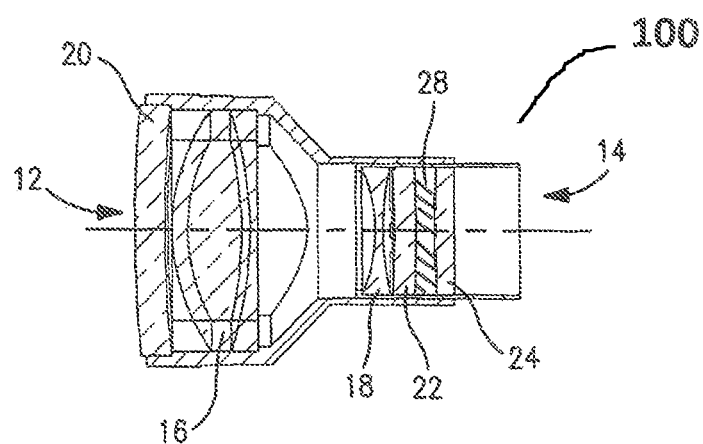
FIG. 2 is a cross-sectional, through section A-A, assembled view of the device illustrated in FIG. 1.

The magnification device 100 illustrated in the exploded view of FIG. 1 is shown assembled in FIG. 2, taken along line A-A. As needed, a lens 24, for spectacle correction may be present in the device 100 and mounted in housing portion 10b adjacent the proximal end 14. To the extent a spectacle correction lens is unnecessary, the lens 24 is plano. Regardless of which type of lens 24 is included in the device 100, the spectacle correction or plano lens closes the proximal end 14 of the housing portion 10b. Lenses 16, 18, and 24 and filters 22 and 20 are mounted in the housing with an epoxy or other suitable adhesive.

Figure 3:
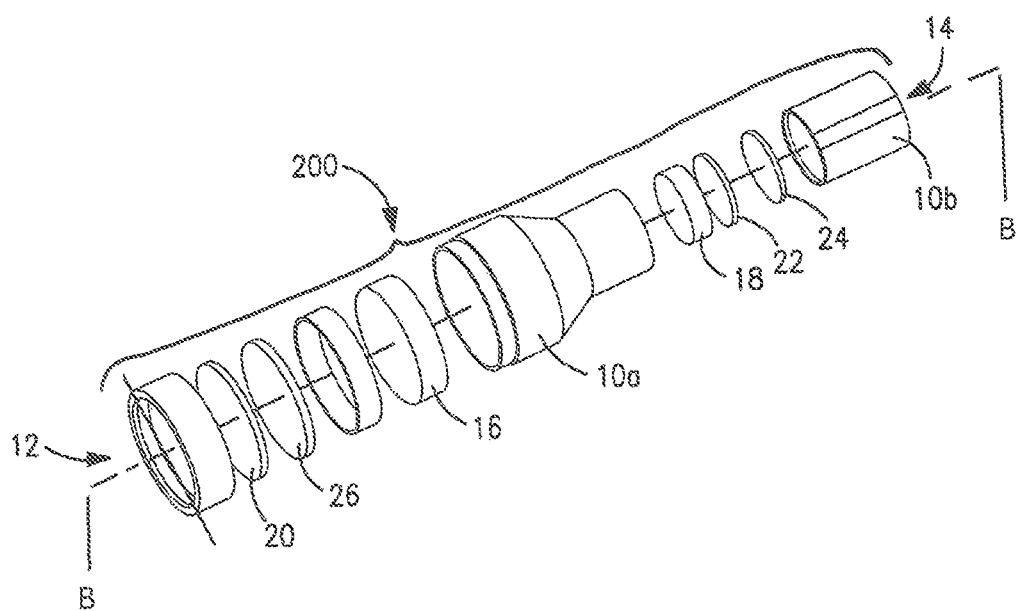
FIG. 3 is an exploded perspective view of a magnification device according to a second aspect of the invention.
Figure 4:
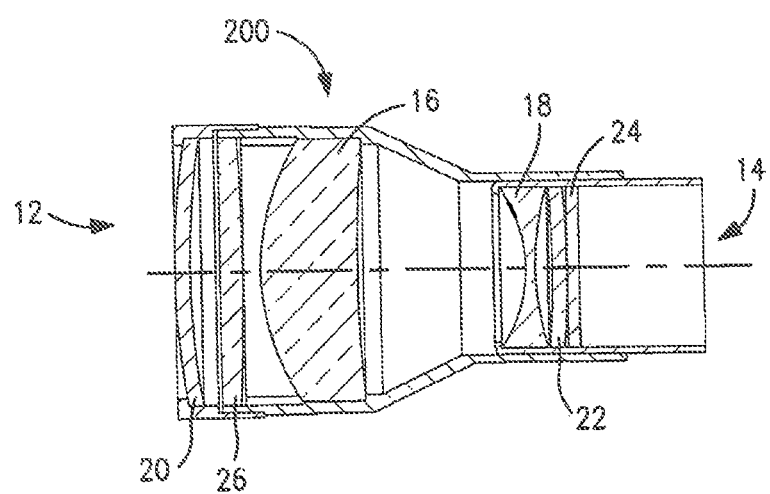
FIG. 4 is a cross-sectional, through section B-B, assembled view of the device illustrated in FIG. 3.

Referring to FIG. 3, a magnification device 200 according to a second aspect of the invention is illustrated. In this aspect, a working distance lens 26 is included in the device 200, which is further illustrated in an assembled state, in the cross-sectional view of FIG. 4, taken along line B-B of FIG. 3.

Lenses having magnification, i.e., collecting optics, produce an increase in energy or power density, as the beam diameter is reduced by the magnifying power of the optics, which, when viewing a light beam through the lenses, may increase and result in hazardous exposure conditions to the eye. Although some LED based light systems are incapable of producing hazardous exposure conditions during normal operation, when viewing a beam through an optical instrument, for example, an eye-loupe, the hazards may be increased. In the optical systems of the magnification devices described herein, which collect light through the objective lens(es) 16, the hazards from light systems (e.g., UV based LED) are magnified, and can easily damage a person's vision since the cornea and lens focus the light energy onto the retina. When viewing the light (through intra-beam viewing) the hazard may be increased by as much as the square of the magnifying power of the optical magnification device.

Advantageously, the filtering system according to the invention blocks or filters the harmful transmission of electromagnetic radiation prior to becoming collected and increased by the optical system, and prior to entering the objective lens(es) 16, while being transparent to maximize visible light transmission. The filtering system, as illustrated in FIG. 1, includes an exterior first filter lens 20 mounted to the distal open end 12 of the housing 10a. The exterior filter lens 20 closes the distal open end 12 of the housing 10a. The exterior filter lens 20 advantageously attenuates the electromagnetic radiation to a safe level, but some radiation is still transmitted through the device. As the remnants of the radiation are transmitted through the optical system, the remnants are magnified to a level that may become dangerous. To attenuate the remaining radiation that has become magnified by passing through the optical system, the filtering system also includes a second filter lens 22 mounted adjacent to the proximal open end 14 of housing 10b. The second filter lens 22 of the filtering system is provided in the interior of the housing 10b to eliminate any possibility of harmful radiation reaching the user's eyes through any of the lenses (objective or eye lens(es)) of the magnification device.

The type of filters suitable for use according to the invention depend upon the radiation-emitting device being used during a procedure. For example, to prevent damage from a light transmitting beams at wavelengths ranging between about 2600 to about 3000 nm would require a filtering system that blocks wavelengths in the above-described range. There are many different types of LEDs available on the market suitable for use, some of which are capable of emitting more than one wavelength.

Depending upon the LED used, the application, and the manner in which the LED is used, a protection factor, i.e. the Optical Density (OD), is calculated with respect to the filter(s). The higher the OD factor, the higher the attenuation. Filters suitable for use according to the invention are available from NoIR Laser Company, L.L.C. of South Lyon, Mich. and/or Honeywell Safety Products, Smithfield R.I. The filters 20 and 22 may suitably be formed of polycarbonate.

Figure 5:
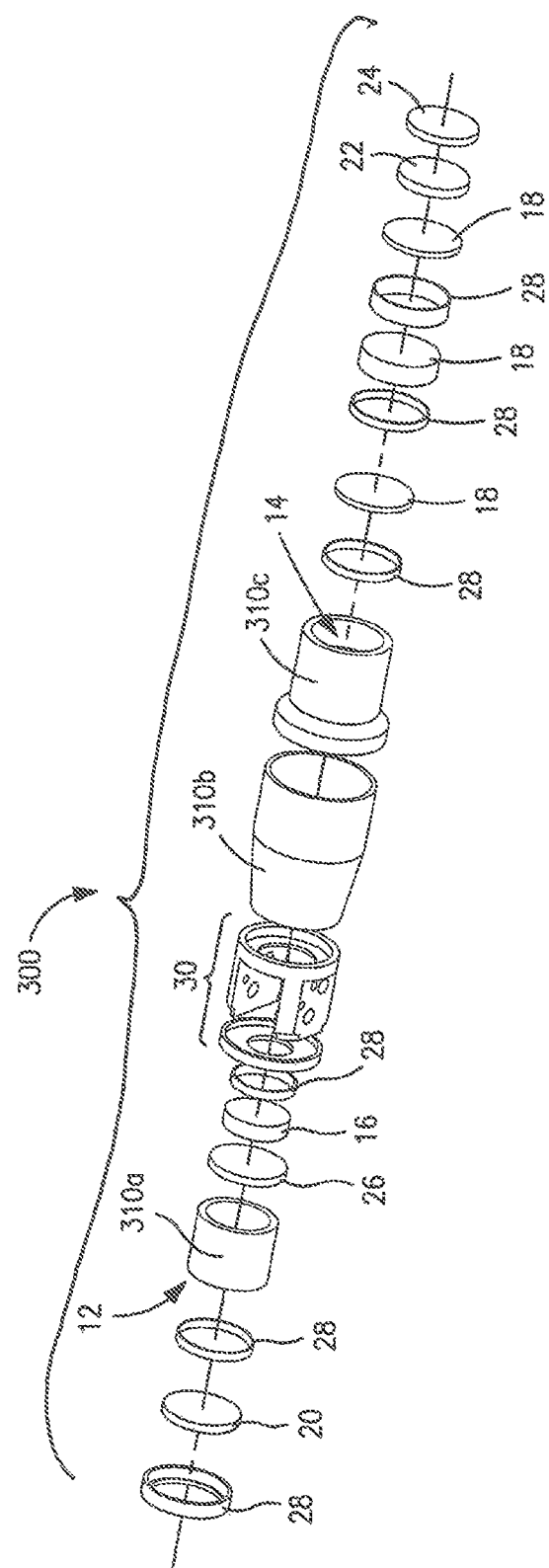
FIG. 5 is an exploded perspective view of a magnification device according to another aspect of the invention.

FIG. 5 illustrates a magnification device 300 according to another aspect of the invention. In this aspect, a Keplerian optical system is employed to provide a wider field of view than the Galilean system, which has a relatively small field of view. The Galilean system, however, is lighter in weight than the Keplerian system. The housing for the optical and filtering system includes three separate housing portions, 310a, 310b and 310c. The three housing portions are provided to allow for the precise placement of the objective lens(es) 16, the prism assembly 30, and the eye lens(es) 18 prior to assembly.

As with devices 100 and 200, the filtering system includes an exterior filter lens 20 mounted to the distal open end 12 of the housing 310a. The filter lens 20 closes the distal open end 12 of the housing 310a. The filtering system also includes a second filter lens 22 mounted adjacent to the proximal open end 14 of housing 310c. A prescription or plano lens 24 is mounted to and closes the proximal open end 14 of housing portion 310c. As described above, the second filter lens 22 is provided to ensure that no harmful radiation reaches the user's eyes through any of the lenses (objective or eye lens(es)) of the magnification device.

In this aspect, spacers 28 are used to separate the various lenses 16 and 18. For example, a spacer 28 is illustrated in FIG. 5 between the housing 310a and the exterior filter lens 20. Additional spacers 28 are illustrated between the eye lenses 18. The spacers 28, which may suitably be formed of plastic, provide for proper placement and retention of the lenses 16, 18 and 20 within the housing portion 310a and housing portion 310c. A working distance lens 26 may also be present in the device.

In the Keplerian optical system, the one or more objective lenses 16 may be substantially circular, or could be rectangular, and may include, but are not limited to, convex, biconvex, plano convex, doublet plano-convex, doublet biconvex, and other suitable precision magnification lenses. The device 300 illustrated in FIG. 5 includes three eye lenses 18. In this aspect of the invention, one or more of the eye lenses 18 is positive, convex, or bi-convex or achromat.

Figure 6:
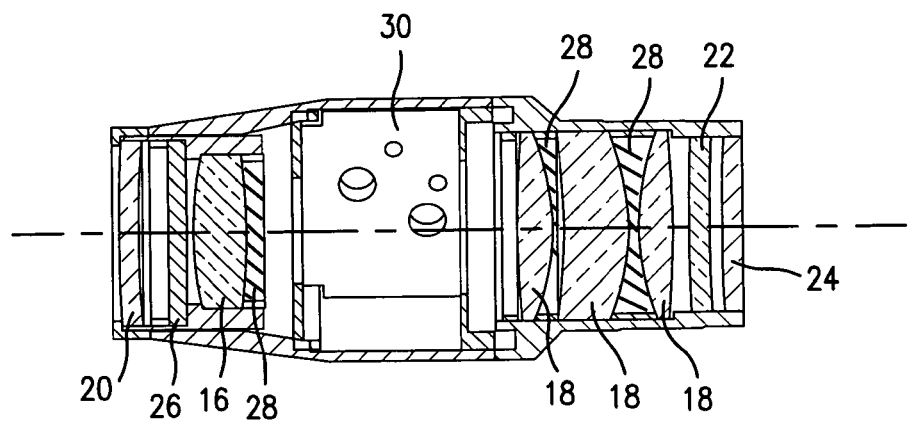
FIG. 6 is a cross-sectional view of the device illustrated in FIG. 5.
Figure 7:
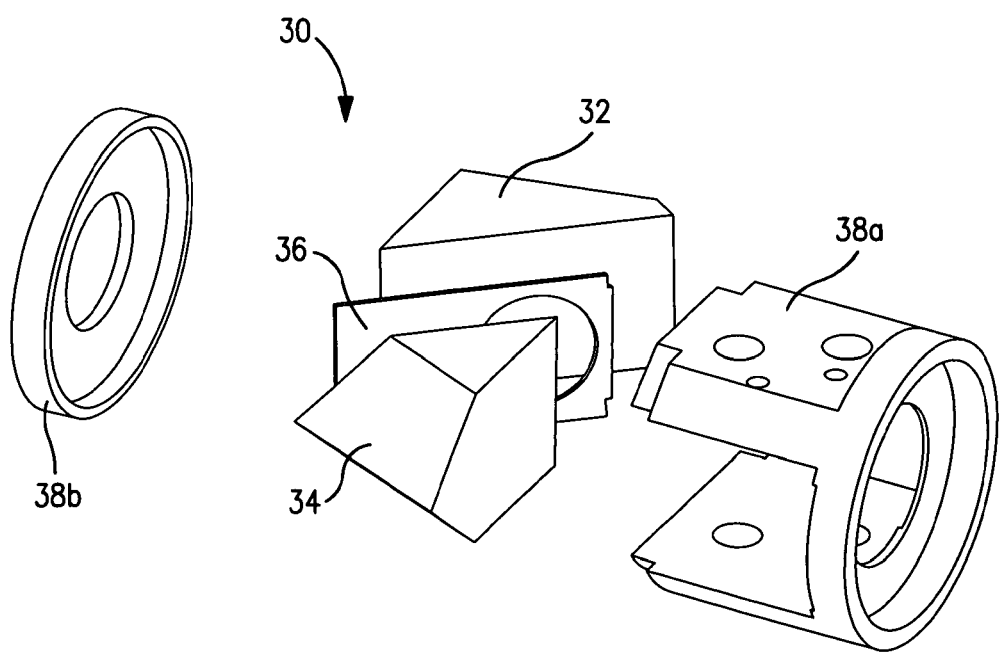
FIG. 7 is an exploded view of a prism assembly illustrated in FIG. 5.

The device 300 of FIG. 5 is illustrated in FIG. 6 in an assembled state. The prism assembly 30 illustrated in FIG. 5 is illustrated in further detail in FIG. 7.1n FIG. 7, the prism assembly 30 includes an Amici prism 32 and a Schmidt prism 34, separated by a divider 36, and disposed in a housing 38a and 38b. The apertures formed in the housing 38a and 38b and in the divider 36 allow for the passage of light. Since the Keplerian optics employed in this aspect of the invention inverts the orientation of a viewed image or object, the prism assembly 30 is provided to invert the viewed object so that it appears in the correct context to preserve the field of view.

Figures 8, 9:
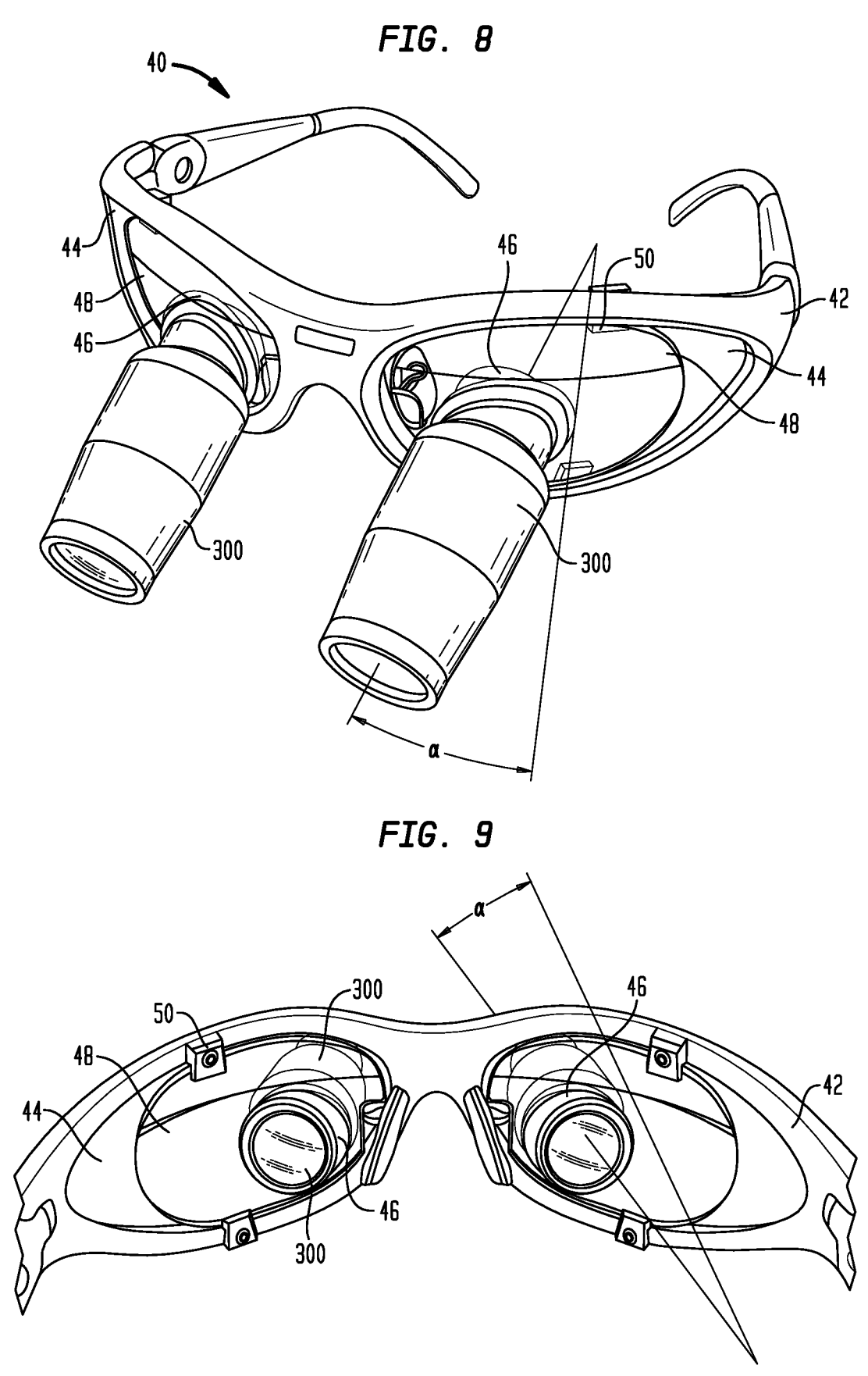

Referring now to FIGS. 8 and 9, magnification devices or loupes according to an aspect of the invention are illustrated as being disposed in a carrier device 40 to provide binocular vision to a user. The carrier device 40 in this aspect is a spectacle, or an eyeglass, frame 42 with carrier lenses 44. Alternative carrier devices 40 may include headbands, goggles, visors, or other devices suitable for supporting the magnifying devices to provide binocular vision. The carrier lenses 44, each include an aperture 46 through which the magnification devices 100, 200, or 300 are mounted. The carrier lenses 44 may be plano or prescription, and are configured for preventing the harmful transmission of radiation as with filter lenses 20 and 22. Additional supporting spectacle lenses 48 may be secured to the spectacle frame 42 by a clip 50 or other conventional means. Although a Keplerian assembly according to an aspect of the invention is illustrated in FIGS. 8 and 9, it should be understood that a Galilean assembly may also be mounted on a spectacle frame 42 or other suitable carrier devices 40 as described above.

As illustrated in FIGS. 8 and 9, the magnification devices are positioned in the carrier lenses at a selected angle of declination (a) to provide a user with ease of use, and to promote proper posture for the back, neck, head, and eyes that may be assumed when working at a close distance.

According to an aspect of the invention, the filtering system attenuates wavelengths from a radiation-emitting source, for example, an LED (i.e., an non-lasing LED and a lasing diode), in the range of about 190 to about 400 nm (UV light). In another aspect, the filtering system attenuates wavelengths in the range of about 730 nm to about 760 nm, in the range of about 785 nm to about 1090 nm, and in the range of about 2700 nm to about 2950 nm. According to another aspect of the invention, the filtering system attenuates wavelengths at about 10600 nm. It should be understood that additional wavelengths may be filtered, as the above ranges of wavelengths are not meant to be exhaustive.

Advantageously, the magnification devices according to the invention block, or attenuate harmful wavelengths of radiation, including LED light, whether UV, visible or invisible, and provide magnification at a one or more of a plurality of magnifications (e.g., 2.5×, 3.5×, 4.5×, and 6.0×). It should be understood that other magnifications may also be provided.

As the different magnification levels provide different degrees of amplification of the reflected light, the optical density of the filters 20 and 22 require adjustment as a function of the magnification level. For example, a magnification level of 2.5×, may require a filter optical density of at least 5, whereas a magnification level of 6.0×, may require a filter optical density of at least 6, to provide adequate filtering capability to prevent damage to the eye caused by the reflected light.

The optical density of absorptive filters may be determined by an amount of filtering material that is introduced into the base material (e.g., glass, plastic, polycarbonate, etc.). The filtering material may be selected to absorb one or more undesired wavelengths, while allowing other wavelengths to pass through.

Absorptive filters of optical density 5 or greater are known in the art. For example, the filter number 109 manufactured by Honeywell, Co., is an example of an absorptive filter having an optical density of 5 that is suitable for use as filter 20 in the device shown in FIG. 1. For absorptive filters of optical density 6, the absorptive filter may be manufactured using a thicker base material and/or greater concentration of filtering material. However, as the optical density increases, the cost of manufacture and the filter weight increases. In addition, the amount of light in a desired visible wavelength range reaching the eye decreases; causing the image being viewed to be darker.

In one aspect of the invention, a plurality of absorptive filters may be used as the filter 20 in the device shown in FIG. 1, wherein each of the plurality of absorptive filters has an optical density less than the required density value. However, the combined filtering effect of the plurality of absorptive filters achieves the required (or desired) optical density. For example, two absorptive filters, each having an optical density 3 may be used as the filter 20 in the device shown in FIG. 1, to achieve an optical density of at least 5. Determination of optical densities of individual ones of the plurality of absorptive filters to achieve a desired combined optical density is determinable, without undue experimentation. Hence, the use of one or more absorptive filters, each having an optical density less than a desired optical density, has been contemplated and considered within the scope of the invention claimed.

In addition, as absorptive filter properties are generally additive, the placement of the absorptive filter(s) may be distributed to provide a clearer image of the object being viewed. In one aspect of the invention, one absorptive filter, having a first optical density, may be positioned at the distal end of housing 10a, and a second absorptive filter, having a second optical density, may be positioned at the proximal end of housing 10b. In this manner, the optical densities of the filters at the distal and proximal ends may be the same or different so that the combination of the absorptive filters achieves a combined desired optical density.

Reflective filters, on the other hand, are manufactured by depositing a reflective coating on a base material (i.e., glass, plastic polycarbonate). The reflective coating may reflect one or more desired wavelengths while allowing other wavelengths to pass through un-attenuated (or with limited attenuation). A dielectric glass filter manufactured by Honeywell, Co., having an optical density of 5 is known in the art.

However, the thickness of the reflective coating does not determine the reflective properties of the filter. Thus, in the one aspect of the invention, wherein more than one reflective filter is used, the optical densities of the individual filters may be selected to achieve a combined desired optical density. Determination of optical densities of individual reflective filters to achieve a desired combined optical density is determinable without undue experimentation. Hence, the use of one or more reflective filters, each having an optical density less than a desired optical density, has been contemplated and considered within the scope of the invention claimed. Hence, a plurality of reflective filters, each having an optical density less than a desired optical density may be selected as filter 22, shown in FIG. 1.

As would be appreciated, the desired optical density of the absorptive lens 20 and the reflective lens 22 may be the same or different.

In another aspect of the invention, using multiple absorptive and reflective filters, the filter lens arrangement may be selected to provide a desired absorption/reflective capability of selected wavelengths while providing maximum throughput of the remaining (unabsorbed/unreflected) wavelengths.

Figure 10:
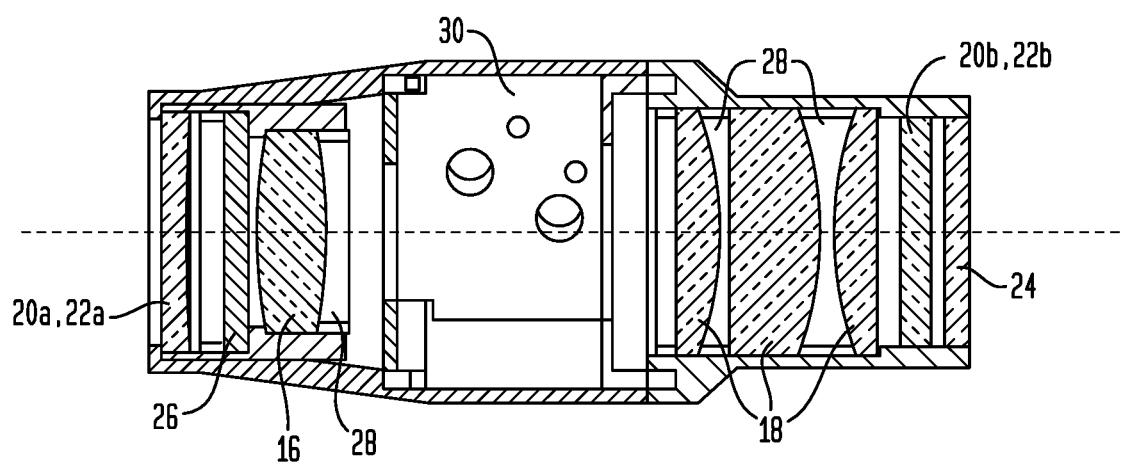
FIG. 10 is a cross-sectional view of a magnification device in accordance with a second embodiment of the invention.

FIG. 10 illustrates an exemplary magnification device in accordance with an aspect of the invention, wherein two absorptive filters and two reflective filters are used to achieve a desired combined optical density. In this illustrative embodiment, a first absorptive filter 20a, having a known optical density, absorbs light energy at at least one wavelength (e.g., 800, 810, 940, 980, 1064 nm) and a first reflective filter 22a, having a known optical density, reflects light energy at at least one wavelength (e.g., 2780, 2940, 10600 nm) are positioned in front of the objective lens 16.

The light energy remaining after absorption and reflection by the combined filter lens 20a and 22a, traverses the magnification system, (i.e., objective lens(es) 16 and eyelens(es) 18, wherein the remaining light energy is amplified based on the magnification level of the magnification system. Wavelengths (e.g., 800, 810, 940, 980, 1064 nm) of the magnified remaining light are filtered by a second absorptive filter 20b, behind the eye lens 18. The second absorptive filter 20b may have an optical density similar to or different from the optical density of the first absorptive filter 20a. Similarly, the magnified remaining unabsorbed light energy is applied to a second reflective filter 22b, which is positioned behind the eye lens, wherein selected wavelengths (e.g., 2780, 2940, 10600 nm, etc.) are reflected. The second reflective filter 22b may have an optical density similar to or different from the optical density of the first reflective filter 22a. In this case, the optical densities of the individual absorptive filters combine to achieve a desired optical density and the optical densities of the individual reflective filters combine to achieve a second desired optical density.

Although, FIG. 10 illustrates an exemplary magnification device in accordance with the principles of the invention, it would be recognized that other positions or orientations of the plurality of absorptive and reflective filters may be achieved and, have been contemplated and considered within the scope of the invention. For example, at least two absorptive filters may be positioned at the distal end of housing 10a while two reflective filters may be positioned at the proximal end of housing 10b—each having an optical density less than a desired corresponding optical density. In another configuration, two absorptive and one reflective filter may be positioned at the distal end of housing 10a and one reflective filter may be positioned at the proximal end of housing 10b. Other combinations of a number of filters (absorptive/reflective) and the placement of theses filters have been considered, and considered within the scope of the invention claimed.

In one aspect of the invention, absorptive filter 20 (FIG. 1) may possess absorptive properties at one or more wavelengths. In one embodiment of the invention, the absorptive filter 20, may provide filtering (i.e., high absorption) at one or more wavelengths selected from a group comprising 800 nm, 810 nm, 940 nm, 980 nm and 1064 nm. Similarly, reflective filter 22 (FIG. 1) may possess reflective filtering properties (i.e., high reflectivity) at at least one wavelength selected from a group comprising 2780 nm, 2940 nm, and 10600 nm.

Figure 11:
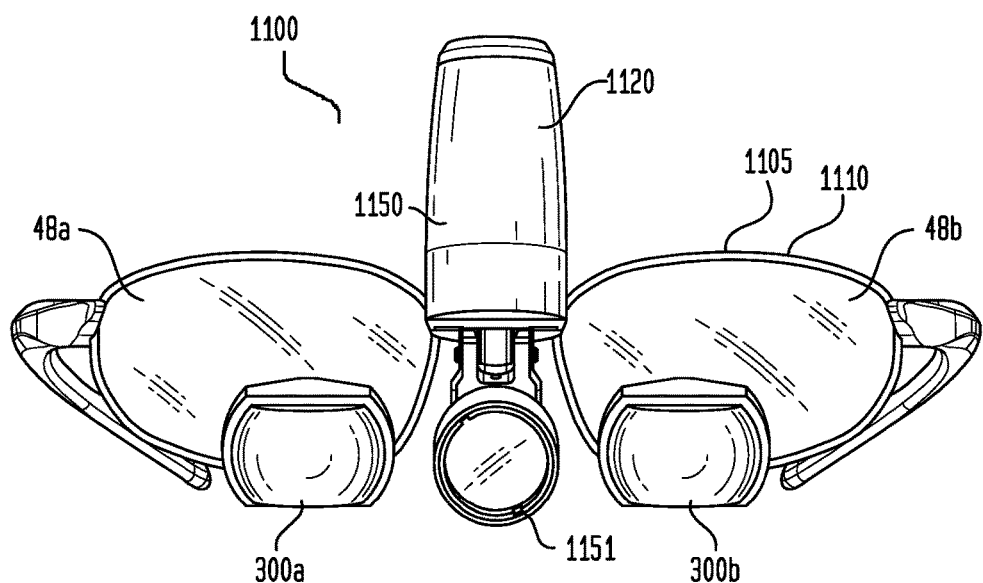
FIG. 11 illustrates a front view of an application of the exemplary magnification device shown in FIG. 1.

FIG. 11 illustrates a front view of an application 1100 of the exemplary magnification device shown in FIG. 1.

In this illustrated embodiment, headlight assembly 1150 is attached to a frame 1105 of an eyewear 1110 designed specialized for the medical and/or dental industries. Eyewear 1110 comprises lens 48 (of which left and right lens are labelled 48a, 48b, respectively). Left and right lens 48a, 48b may be ordinary glasswear or may be prescriptive glasswear. Left and right lens 48a, 48b may be clear or tinted, wherein the tinting may be used to protect the eyes from stray light that may be damaging to the user. Eyewear 1110 may also be a headband or a headset, which are well-known devices (i.e., means) for attaching the telescopic lens and/or lighting elements to a user. Also illustrated are telescopic lens 300a, 300b attached to corresponding left and right lens, 48a, 48b, respectively.

In one aspect of the invention, headlight assembly 1150, including a housing 1151, includes at least one light source (e.g., non-lasing LED and/or diode laser) contained therein. The housing 1151 (and the lighting source contained therein) is oriented at a depression angle (with respect to a horizontal light through eyewear 1110) similar to that of the angle of telescopic lens 300 (labelled left and right 300a, 300b, respectively) in order to direct light generated by the LED to an area that is substantially convergent with a focal point of telescopic lens 300a, 300b.

Contained within each of the telescopic lens 300a, 300b is the wavelength filtering system described with regard to FIG. 1. The filtering system within a corresponding telescopic lens 300a, 300b, attenuates any reflected light generated by the LED contained in the housing 1151.

Further illustrated is a pod 1120. Pod 1120 contains a power source (i.e., a battery) that is used to power the LED within the housing 1151 and other electronic circuitry (not shown) that is used to control a voltage (or current) applied to the lighting source.

For example, the electronic circuitry may be configured to allow for a capacitive touch of a metallic elements on the pod 1120 to turn on/turn off the voltage or current applied to the lighting source. In another aspect of the invention, the electronic circuitry may be configured to allow for a non-contact control of the voltage (or current) applied to the lighting source.

Non-contact control of the voltage (or current) may be achieved by the occurrence of a detection of a reflection of a transmitted signal. Specifically, a signal (infra-red, ultrasonic, etc.) may be transmitted through a transmitter (not shown) that is reflected by an object passing through the transmitted signal. A reflection of the transmitted signal may be detected by a receiver (or a detector). The receiver or detector may then generate an indication of the reflected signal, which the electronic circuitry, in response to the indication may turn on the lighting source or turn off the lighting source. Although the power source is shown attached to the eyewear 1100, it would be recognized that the power source may be separated from the eyewear and those skilled in the art would have the knowledge to alter the configuration shown to provide power to the lighting source without undue experimentation.

Figure 12:
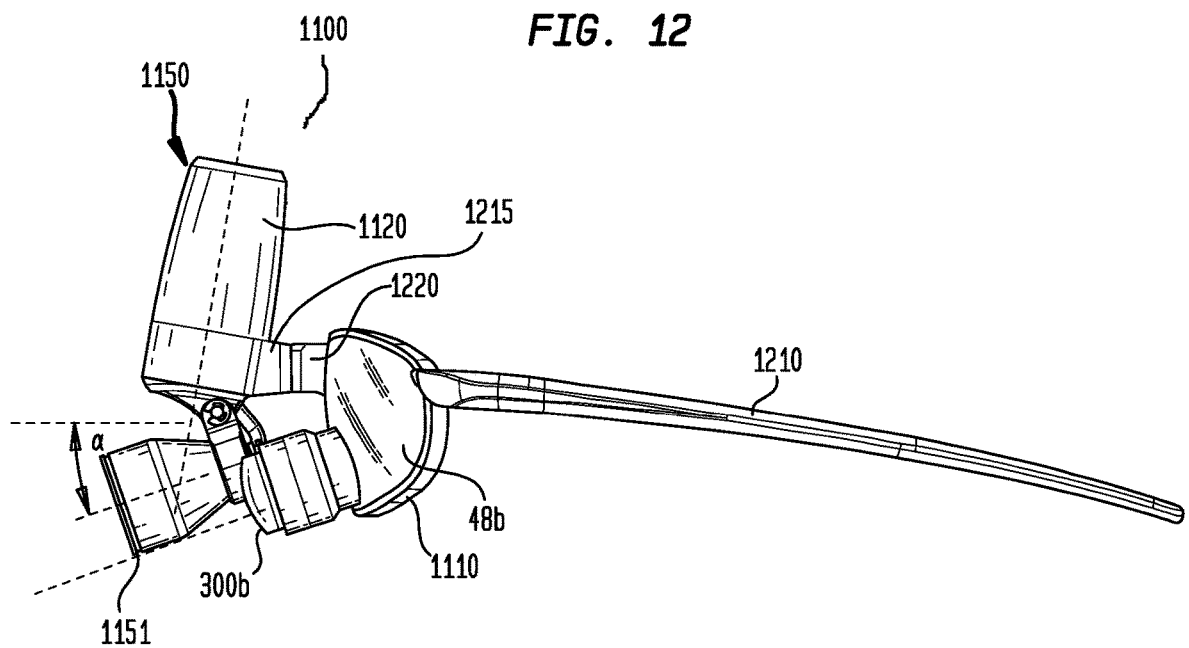
FIG. 12 illustrates a side view of an exemplary application of the exemplary cordless powered headlight assembly shown in FIG. 1.

FIG. 12 illustrates a side view of an exemplary application of the exemplary cordless powered headlight assembly 1100 shown in FIG. 11.

In this illustrated embodiment, eyewear 1110 includes frame 1105 and temple 1210. Temple 1210 provides a conventional means for retaining eyewear 1110 in place on a user's head. Although not shown it would be recognized that the headlight assembly 1150 including the pod 1120 and the housing 1151 may be attached to a headband or headset without altering the scope of the invention.

Also, shown is mating connector 1220 attached to frame 1105. Mating connector 1220 is positioned between lens 300a, 300b to retain headlight assembly 1150 substantially centered with regard to eyewear 1100.

Also shown is connector 1215, on headlight assembly 1150, attached to mating connector 1220. Connector 1215 and mating connector 1220 may be T-slot connectors that allow headlight assembly 1150 to be removable from eyewear 1110. In another aspect of the invention, connector 1215 and 1220 may provide for a fixed attachment, wherein the connectors 1215 and 1220 are a single unit.

Figure 13C:
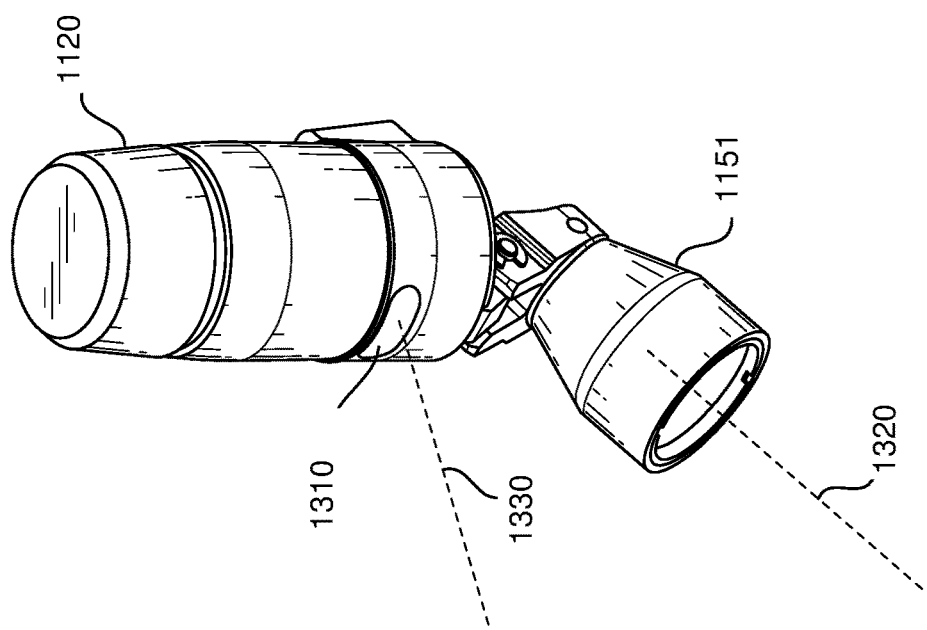
FIGS. 13A-13C illustrate perspective views of a light assembly in accordance with the principles of the invention.
Figure 13B:
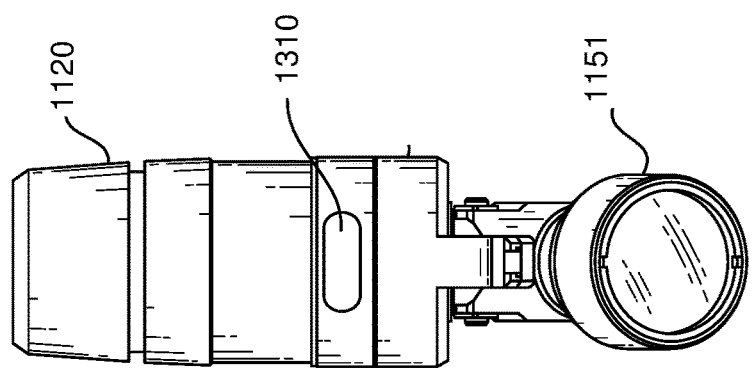
Figure 13A:
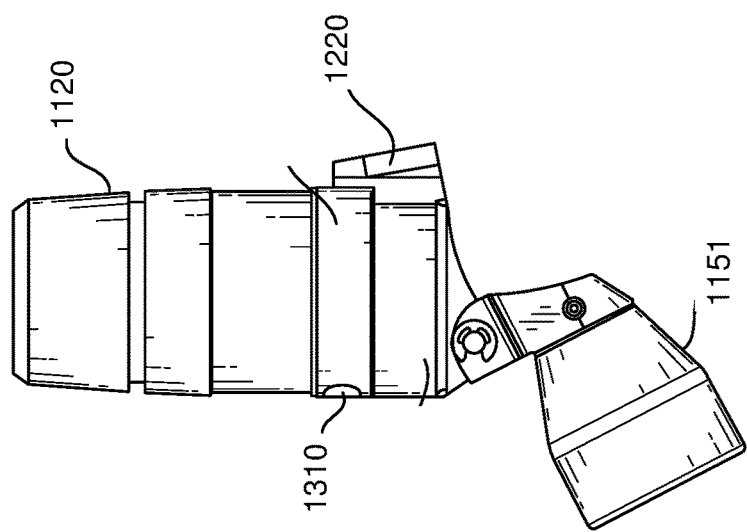

FIG. 13A illustrates a side view of an exemplary headlight assembly 1150 including pod 1120 and housing 1151, similar to that shown in FIG. 12. In this illustrated embodiment, headlight assembly 1150 includes a window 1310 through which a controlling light may be transmitted. FIG. 13B illustrates a front view of an exemplary headlight assembly 1150 including pod 1120 and housing 1151, similar to that shown in FIG. 12. In this illustrated embodiment, the window 1310 is shown. FIG. 13C illustrates a perspective view of the headlight assembly 1150 including pod 1120 and housing 1151 showing an angle of depression 1320 of the headlight assembly. Further shown is an axis 1330 which corresponds to an optical axis of a light passing through window 1310.

In accordance with the principles of the invention, the light passing through window 1310 may be used as a controlling signal that may be used to control at least one of the level of light that is outputted by the at least one light source within housing 1151, the color of the light outputted by the at least one light source within housing 1151 and the wavelength of the light outputted by the at least one light within the housing 1151. For example, a light (e.g., within the infra-Red frequency range) may be outputted through window 1310 and a reflection of the outputted light may then be used to determine the presence of an object intersecting the outputted light beam. The detection of the reflected outputted light may then be used to generate a control signal that is used to control the light outputted by the at least one light source within the housing 1151. In one aspect of the invention, the control signal may be used to turn on (i.e., apply a current) to the at least one light source within housing 1151 or turn off (i.e., remove a current) from the at least one light source within housing 1151. In another aspect of the invention, the control signal may be used to select one of the at least one light sources within housing 1151, wherein the selected one of the at least one light source is associated with a specific wavelength or a range of wavelengths.

In one specific aspect of the invention applied to the dental arts, the invention claimed may be used with at least one fluorescent dye to visualize decay and differentiate between healthy and diseased tissue or caries. Table 1 illustrates a plurality of exemplary fluorescent dyes and wavelengths that are suitable for use in the dental arts.

TABLE 1

| Wavelength (nanometers) | Dye |
| --- | --- |
| 374-403 | 1, 3, 6, 8, Pyrenetertrasulfonic Acid Tetrasodium Salt |
| 494-520 | 5-Carboxyfluorescein Succinimidyl Ester |
| 341-377 | 1-Pyrenehexadeconoic Acid |
| 408-450 | 3-Cyano-7-Hydroxycoumarin |
| 512-563 | 5-Carboxynaphtho-Fluorescein |
| 442-483 | 7-Diethylaminocoumarin-3-Carboxylic Acid |
| 386-448 | 7-Hydroxycoumarin-3-Carboxylic Acid |
| 358-410 | 7-Methoxycoumarin-3-Carboxylic Acid |
| 412-471 | 9-Amino-6-Chloro-2-Methoxyacridine |
| 430-545 | Alexa Fluor 430 Carboxylic Acid Succinimidyl Ester |
| 753-782 | Axexa Fluor 750 Carboxylic Acid Succinimidyl Ester |
| 358-455 | MNarina Blue (6,8-Difluoro-7-Hydroxy-4-Methylcoumarin |
| 434-456 | POPO-1 |
| 535-617 | Propidium Iodide |
| 560 | QSY 7 Carboxylic Acid Succinimidyl Ester |

Although specific fluorescence dyes are discussed, it would be recognized that the invention claimed is not limited to the specific dyes disclosed but may be applicable to other dyes, without altering the scope of the invention.

As shown in Table 1, a range of suitable wavelengths, for use with the invention claimed, range from approximately 350-800 nm. As infra-Red light is in a wavelength range of 1000 to 750 nm, visible light is in a wavelength range of 750 to 400 nm and ultra-Violet light is in the range of 400 to 10 nm, the at least one light source within housing 1151 may comprise at least one LED suitable for outputting a light within a range of 350-800 nm. Alternatively, the at least one light source may comprise LEDs that are specifically designed for a particular wavelength range (i.e., infra-Red, visible, UV).

In one aspect of the invention, the housing 1151 may include at least one of each of an infra-Red LED, a visible LED, and a UV LED. A switch on housing 1151 may be used to pre-select one of the at least one LED within a specific wavelength range. The selected at least one LED wavelength range may be selected based on the desired dye to be used. As would be recognized, the tinting of the lens 48*a*, 48*b* (FIG. 12) would be tinted based on the selected LED wavelength range.

Alternatively, selection of one of the at least one LEDs associated with a specific wavelength range may be determined using the non-contact switch disclosed in FIGS. 13A-13C. For example, selection of one of the plurality of wavelength ranges may be determined by the sequential passing of an object before the light transmitted through the window 1310. For example, a first pass may represent a turn on of a LED in the infra-Red range, wherein a second pass may turn off the LED in the infra-Red range and turn on an LED in the visible light range. A third pass may turn off the LED in the infra-Red range and turn on an LED in the UV light range.

Alternatively, the switching between the different wavelength ranges may be determined based on a duration of time an object remains within the path of the light transmitted through window 1310. For example, a first pass transverse to the light path outputted through window 1310 may cause a default light (e.g., visible light) to be outputted (i.e., the LED associated with the visible light range is turned on). When the object remains in the light path outputted through window 1310 for a first period of time, the visible LED light may be turned off while the infra-red LED is turned on. If the object remains in the light path for a second period of time (greater than the first period of time) the IR LED may be turned off and the UV LED may be turned on.

In summary, a magnification device that provides for protection of a user's eyes from stray and harmful lighting while providing a maximum amount of visible light to pass through has been disclosed. The magnification device incorporates a filtering system which includes elements having an optical density selected based on the degree of magnification of the magnification device. Further disclosed is a system that incorporates the magnification device and a lighting source into a means for attaching the magnification device and the light source to the user. The lighting source is oriented such that the light (UV, visible, IR) may be directed to a working area, which is commensurate with an optical axis of the magnification device. The filtering system within the magnification device provides the user with protection from light, harmful to the eyes, that is reflected from the working surface and viewed through the magnification device.

Further disclosed is a system for controlling the output of the light outputted through a stationary (or fixed) means or by dynamically selecting which of a plurality of LEDs may be turned-on or turned-off.

Although the invention disclosed herein discusses specific wavelengths that are produced with currently available LEDs (i.e., non-lasing light emitting diodes and laser diodes), it would be recognized that the specific wavelengths absorbed and/or reflected may be changed and/or added to without altering the scope of the invention. In addition, it would be known in the art that the specific wavelengths discussed herein represent a band of wavelengths centered on the wavelengths presented herein to account for divergence of the wavelength generated by the LED caused during the generation of the light and/or the operation of the LED, wherein the light generated is represented as a nominal value.

The invention has been described with reference to specific embodiments. One of ordinary skill in the art, however, appreciates that various modifications and changes can be made without departing from the scope of the invention as set forth in the claims. Accordingly, the specification is to be regarded in an illustrative manner, rather than with a restrictive view, and all such modifications are intended to be included within the scope of the invention.

Benefits, other advantages, and solutions to problems have been described above with regard to specific embodiments. The benefits, advantages, and solutions to problems, and any element(s) that may cause any benefits, advantages, or solutions to occur or become more pronounced, are not to be construed as a critical, required, or an essential feature or element of any or all of the claims.

What is claimed is:

1. A vision enhancing device, comprising:
a frame, configured to attach to a user, comprising:
at least one lens;
a housing configured to:
attach to the frame, said housing comprising:
a light emitting diode configured to generate a first light toward an object; and
a magnification device corresponding to each of the at least one lens, said magnification device comprising:
an optical system comprising:
at least one objective lens; and
at least one eye lens, separated from said at least one objective lens, wherein said at least one objective lens, said at least one eye lens and said separation between said at least one objective lens and said at least one eye lens defining a level of magnification of light entering said optical system; and
a filtering system comprising:
an absorptive filter system having a first optical density selected based on said level of magnification of said optical system, and
a reflective filter system having a second optical density selected based on said level of magnification of said optical system, wherein the filtering system is configured to:
block reflection of the first light by the object through said optical magnification system; and
allow passage of a second light through said optical magnification system, wherein said second light, being of a wavelength different than a wavelength of the first light, is generated in response to the first light interacting with the object.

2. The vision enhancing assembly according to claim 1, further comprising:
means to apply a current to the light emitter diode configured to generate the first light.

3. The vision enhancing assembly according to claim 1, wherein the first light comprises at least one of: an ultraviolet light, a visible light and an infra-red light.

4. The vision enhancing assembly according to claim 1, wherein at least one of said at least one objective lens is convex.

5. The vision enhancing assembly according to claim 1, wherein said optical system is one of: Galilean and Keplerian.

6. The enhancing assembly according to claim 1, wherein at least one of said at least one eye lens is concave or negative.

7. The enhancing assembly according to claim 1, wherein at least one of said at least one eye lens is convex or positive.

8. The enhancing assembly according to claim 1, wherein said optical system comprises:
a spectacle correction lens.

9. The vision enhancing assembly according to claim 1, wherein said absorptive filter system comprises:
at least one absorptive lens, wherein a combined optical density of said at least one absorptive lens is at least equal to said first optical density.

10. The vision enhancing assembly according to claim 9, wherein at least one absorptive lens is positioned substantially adjacent to one of: said at least one objective lens and said at least one eye lens.

11. The vision enhancing assembly according to claim 1, wherein said reflective filter system comprises:
at least one reflective lens, wherein a combined optical density of said at least one reflective lens is at least equal to said second optical density.

12. The vision enhancing assembly according to claim 11, wherein at least one reflective lens is positioned substantially adjacent to one of: said at least one objective lens and said at less one eye lens.

13. The vision enhancing assembly according to claim 1, wherein said absorptive filter system comprises:
an absorptive lens having said first optical density, said absorptive lens being positioned at one of: in front of said at least one objective lens and behind said at least one eye lens.

14. The vision enhancing assembly according to claim 1, wherein said reflective filter system comprises:
a reflective lens having said second optical density, said reflective lens being positioned at one of: in front of said at least one objective lens and behind said at least one eye lens.

15. The vision enhancing assembly according to claim 1, wherein said light emitting diode configured to generate said first light is one of: a non-lasing light emitting diode and a lasing light emitting diode.

16. The vision enhancing device of claim 1, wherein the first light is generated in a range of: 10 nm to 1000 nm.

17. The vision enhancing device of claim 1, wherein each of the at least one lens is tinted to block said first light.

18. A headwear comprising:
a light assembly configured to be positioned on the headwear, the light assembly configured to generate a first light in a violet light wavelength range toward an object;
a magnification device configured to be positioned on the headwear, said magnification device comprising:
an optical magnification system comprising:
at least one objective lens and at least one eye lens, said at least one objective lens and at least one eye lens being separated by a distance, wherein said at least one objective lens, said at least one eye lens and said distance defining a level of magnification of said optical magnification system; and
a filtering system comprising:
an absorptive filter system having a first optical density, wherein the first optical density is selected based on said level of magnification, and
a reflective filter system having a second optical density, wherein the second optical density is selected based on said level of magnification, said filtering system configured to:
block reflection, by the object, of the first light through said optical magnification system; and
allow passage of a second light through said optical magnification system, said second light being generated, in response to the first light, at a wavelength different than a wavelength of the first light.

19. The headwear of claim 18, wherein the light assembly further configured to:
generate another light in one of: a visible light wavelength range and an infra-red light wavelength range.

20. The headwear of claim 19, wherein the light generated by the light assembly is in a range of 10 nm to 1000 nm.

21. A vision enhancing device comprising:
   means to emit a first light toward an object, wherein a wavelength of the first light is selected based on a dye applied to the object;
   an optical magnification system comprising:
      an optical magnifier comprising:
         an objective lens; and
         an eye lens, separated from the objective lens, wherein the separation of the objective lens and the eye lens contributes to said optical magnification system defining a level of magnification of light entering the objective lens; and
      a filter system comprising:
         at least one filter, wherein an optical density of the at least one filter is selected based on the level of magnification of the optical magnification system, said filter system configured to:
            receive a reflection of the first light, and a second light, wherein a wavelength of the second light is determined by an interaction of the first light with the dye;
            block said reflection of said first light from exiting the optical magnification system; and
            allow passage, through the optical magnification system, of the second light.

22. The vision enhancement device of claim 21, wherein the filter comprises:
   at least one of: an absorptive filter and a reflective filter, wherein an optical density of a corresponding one of the at least one of: the absorptive filter and the reflective filter is selected based on the level of magnification of the optical magnification system.

23. The vision enhancement device of claim 22, wherein the corresponding one of the absorptive filter and the reflective filter are positioned adjacent to at least one of: the objective lens and the eye lens.

24. The vision enhancement device of claim 21, wherein the second light is at a longer wavelength than a wavelength of the first light.

25. The vision enhancement device of claim 21, wherein the first light is generated in one of: a near ultra-violet range, a far ultra-violet range, a visible light range and an infra-red range.

\* \* \* \* \*

UNITED STATES PATENT AND TRADEMARK OFFICE
CERTIFICATE OF CORRECTION

PATENT NO. : 10,725,284 B1
APPLICATION NO. : 16/192768
DATED : July 28, 2020
INVENTOR(S) : Richard E. Feinbloom and Liviu Steier It is certified that error appears in the above-identified patent and that said Letters Patent is hereby corrected as shown below:

Column 13, Line 14, Claim 2 delete "emitter" insert therefor --emitting--

Column 14, Line 2, Claim 10 delete "wherein at" insert therefor --wherein said at--

Column 14, Line 11, Claim 11 delete "wherein at" insert therefor --wherein said at--

Column 14, Line 28, Claim 15 delete "diode configured" insert therefor --diode is configured--

Signed and Sealed this
Twenty-second Day of September, 2020

Andrei Iancu
*Director of the United States Patent and Trademark Office*